(No Model.)
W. T. CARROLL.
NON-METALLIC BEARING.
No. 475,929. Patented May 31, 1892.
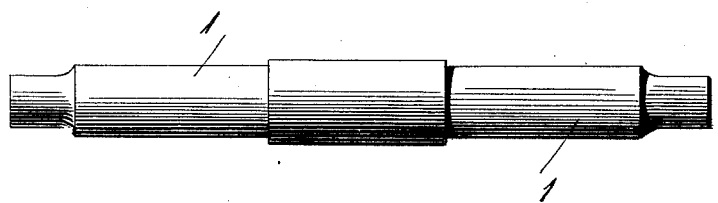
Witnesses
Chas. T. Schurf
John J. Powers.
Inventor
William T. Carroll,
By his Attorney
John C. Dewey

UNITED STATES PATENT OFFICE.

WILLIAM T. CARROLL, OF WORCESTER, MASSACHUSETTS.

NON-METALLIC BEARING.

SPECIFICATION forming part of Letters Patent No. 475,929, dated May 31, 1892.

Application filed February 1, 1892. Serial No. 419,978. (No model.)

*To all whom it may concern:*

Be it known that I, WILLIAM T. CARROLL, a citizen of the United States, residing at Worcester, in the county of Worcester and State of Massachusetts, have invented certain new and useful Improvements in Non-Metallic Bearings; and I do hereby declare that the following is a full, clear, and exact description thereof, which, in connection with the drawing making a part of this specification, will enable others skilled in the art to which my invention belongs to make and use the same.

My invention relates to non-metallic bearings, and more particularly to the wooden bearings of spindles, spinning-rolls, or other similar devices; and the object of my invention is to make a non-metallic bearing which will not require the constant application of oil as a lubricant to lubricate the spindles, spinning-rolls, or other devices running in or on said non-metallic bearings.

My invention consists in combining with a non-metallic bearing a wax—such as beeswax, paraffine-wax, or myrtle-wax (sometimes called "bayberry-tallow")—and thoroughly saturating the non-metallic bearing with the wax, as will be hereinafter fully described.

The drawing represents one form of a non-metallic bearing embodying my invention.

Heretofore when non-metallic bearings have been used for spindles, spinning-rolls, &c., the bearings, generally made of wood, have been soaked in oil for the purpose of lubricating the metallic surfaces which turn in or on said non-metallic bearings.

I have found in practice that by reason of the great speed at which the metallic surfaces are revolved in or on non-metallic bearings the heat produced by friction will cause the oil to ooze or work out from the bearing onto the metal surfaces and to become gummed thereon, and thus interfere with the free operation of the same, and in the case of spinning-rolls the oil will work out of the bearing onto the metal surfaces of the roll and onto the exterior surface thereof and stain the cotton or other material which is being spun, and, further, where oil is used as a lubricant on non-metallic bearings a constant application of the oil is required, and in the case of spindles means must be provided by which the oil may be applied whenever desired.

To avoid the objections above mentioned to the use of oil as a lubricant on non-metallic bearings, I have substituted for the oil a wax, preferably beeswax or paraffine-wax or myrtle-wax. I have found that neither beeswax or paraffine-wax or myrtle-wax can be used as a lubricant on a metallic bearing, as there is no oil or grease in them; but in the case of non-metallic bearings made of wood, vulcanized fiber, leatheroid, or other similar substances a wax—such as beeswax, paraffine-wax, or myrtle-wax—may be used as a lubricant.

In the accompanying drawing I have shown one form of a non-metallic bearing embodying my invention—to wit, a bearing or arbor 1 for spinning-rolls, which may be made of any non-metallic material and preferably of maple or other wood.

In carrying out my invention I prefer to first boil the wax, causing the same to be in a soluble or liquid state. I then put the non-metallic bearing into the same and let it remain therein until it is soaked in the wax and thoroughly saturated therewith. The bearing is then removed and is ready for use.

I have found in practice that after the non-metallic bearing has been thoroughly saturated in the wax, as above described, the wax will be sufficient for the purpose of lubrication for an indefinite period of time, and, further, the wax remains in the bearing and does not ooze or work out, no matter at how great speed the spindle or other metallic device is revolved in or on said bearing.

I have specified beeswax, paraffine-wax, or myrtle-wax, and I prefer to use said materials, or one of them; but I may use any equivalent material, as stearic acid, spermaceti, or natural beeswax.

The myrtle-wax referred to is made from the bayberry and is sometimes called "bayberry-tallow."

The great advantages of my improvement will be fully appreciated by those skilled in the art after the same has been tried.

Having thus described my invention, what I claim as new, and desire to secure by Letters Patent, is—

A non-metallic bearing thoroughly saturated with a wax, such as beeswax, paraffine-wax, or myrtle-wax, substantially as set forth.

WILLIAM T. CARROLL.

Witnesses:
JOHN C. DEWEY,
JOHN J. POWERS.